United States Patent
Doru

[11] Patent Number: 5,924,477
[45] Date of Patent: *Jul. 20, 1999

[54] BRICK FOR HEAT EXCHANGERS

[76] Inventor: Tatar Doru, Domneasca Street 36 Bloc Modern, Galati, Romania, R-6200

[ * ] Notice: This patent issued on a continued prosecution application filed under 37 CFR 1.53(d), and is subject to the twenty year patent term provisions of 35 U.S.C. 154(a)(2).

[21] Appl. No.: 08/952,332
[22] PCT Filed: Apr. 5, 1996
[86] PCT No.: PCT/IB96/00457
  § 371 Date: Nov. 3, 1997
  § 102(e) Date: Nov. 3, 1997
[87] PCT Pub. No.: WO96/35915
  PCT Pub. Date: Nov. 14, 1996

[30] Foreign Application Priority Data

May 9, 1995 [RO] Romania ................... 95-00870

[51] Int. Cl.⁶ ........................................... F23L 15/02
[52] U.S. Cl. ..................... 165/9.2; 165/9.1; 52/603; 52/604; 52/605; 52/609
[58] Field of Search ................ 165/10, 9.1, 9.2, 165/9.3, 9.4; 52/603, 604, 605, 606, 608, 609

[56] References Cited

U.S. PATENT DOCUMENTS

| Re. 27,020 | 1/1971 | Hauth et al. . | |
|---|---|---|---|
| 2,833,532 | 5/1958 | Ries . | |
| 3,436,064 | 4/1969 | Hauth et al. | 165/9.1 |
| 3,549,136 | 12/1970 | Baab | 165/9.4 |
| 4,150,717 | 4/1979 | Balke et al. | 165/9.4 X |
| 4,346,753 | 8/1982 | Kletch | 165/9.4 X |

FOREIGN PATENT DOCUMENTS

| 1096652 | 6/1955 | France . | |
|---|---|---|---|
| 0041409 | 3/1962 | Luxembourg . | |
| 107441 | 11/1993 | Romania . | |
| 1216623 | 3/1986 | U.S.S.R. | 165/9.1 |

*Primary Examiner*—Christopher Atkinson
*Attorney, Agent, or Firm*—William L. Krayer

[57] ABSTRACT

A hexagonal refractory brick is constructed with tapered sides so it can be stacked 3-on-1 and 1-on-3, the bottom surface of the brick fitting between projections on the top surfaces of three others. A central vertical channel in the brick is complemented by other vertical channels formed by the assembly of a plurality of bricks, and horizontal channels which are relatively wide at the bottom.

8 Claims, 3 Drawing Sheets

1

BRICK FOR HEAT EXCHANGERS

TECHNICAL FIELD

This invention relates to a new type of brick for lining heat exchangers. It is particularly useful in blast furnace stoves.

BACKGROUND OF THE INVENTION

The hexagonal model of heat exchanger brick is well known, with its hexagonal or circular longitudinal inside channels and with a lateral profile selected so that when the bricks are placed next to one another they form other similar longitudinal channels, and by modifying the lower part of the brick in the shape of a step to reduce the outside dimensions, the outside vertical channels can be made to communicate horizontally. Such a brick having a "step" in the lower part of the brick is disclosed in Romanian patent 107441B. These bricks of the prior art have the follow disadvantages:

- as a result of the presence of the step to reduce the horizontal cross-section in the lower part of the contour of the brick, the vertical lateral faces of the brick are complicated and therefore cause additional problems during molding, handling during fabrication and shipment from the point of view of uniformity and of the integrity of the additional edges created;
- because of the position and dimensions of said lateral step, the surface contact of the peripheral vertical faces of the brick with the thermal agent is limited to a reduced percentage of their size.

SUMMARY OF THE INVENTION

The new brick claimed by the invention eliminates the above mentioned disadvantages in that, in order to simplify molding, to eliminate non-uniform pressing and subsequent deterioration of the edges, as well as to increase the contact surface between the lateral face of the brick and the thermal agent, it has a different type of vertical lateral profile which is straight and oriented to obtain a more pronounced tapering of the lateral faces, decreasing from the top face toward the bottom face of the brick, so that the lateral contour consists of straight lines unbroken by a step, and when two bricks are placed next to one another, a triangular space is formed between them over their entire height.

DETAILED DESCRIPTION OF THE INVENTION

Figure 1:
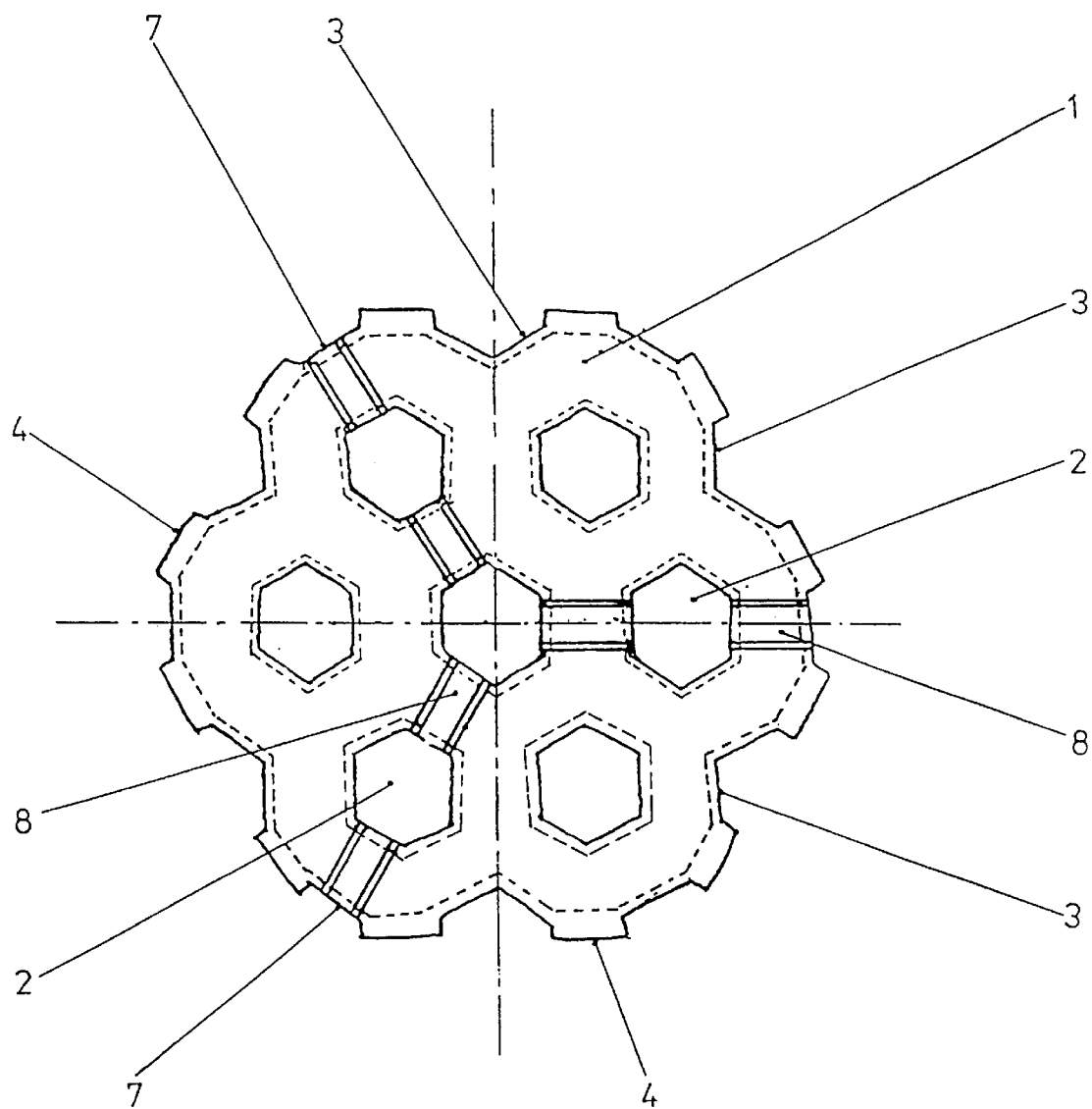
FIG. 1 is an overhead view of my new brick.

Referring first to FIG. 1, this overhead view of the generally hexagonal brick shows refractory material 1 having outside edges 4 and defining seven internal vertical channels 2, six channel half-openings 3 and six corner third-openings 7. The view also shows three radial (at 120°) raised portions 8 which divide the brick top into thirds by extending from the center to three corners of the brick.

Figure 2:
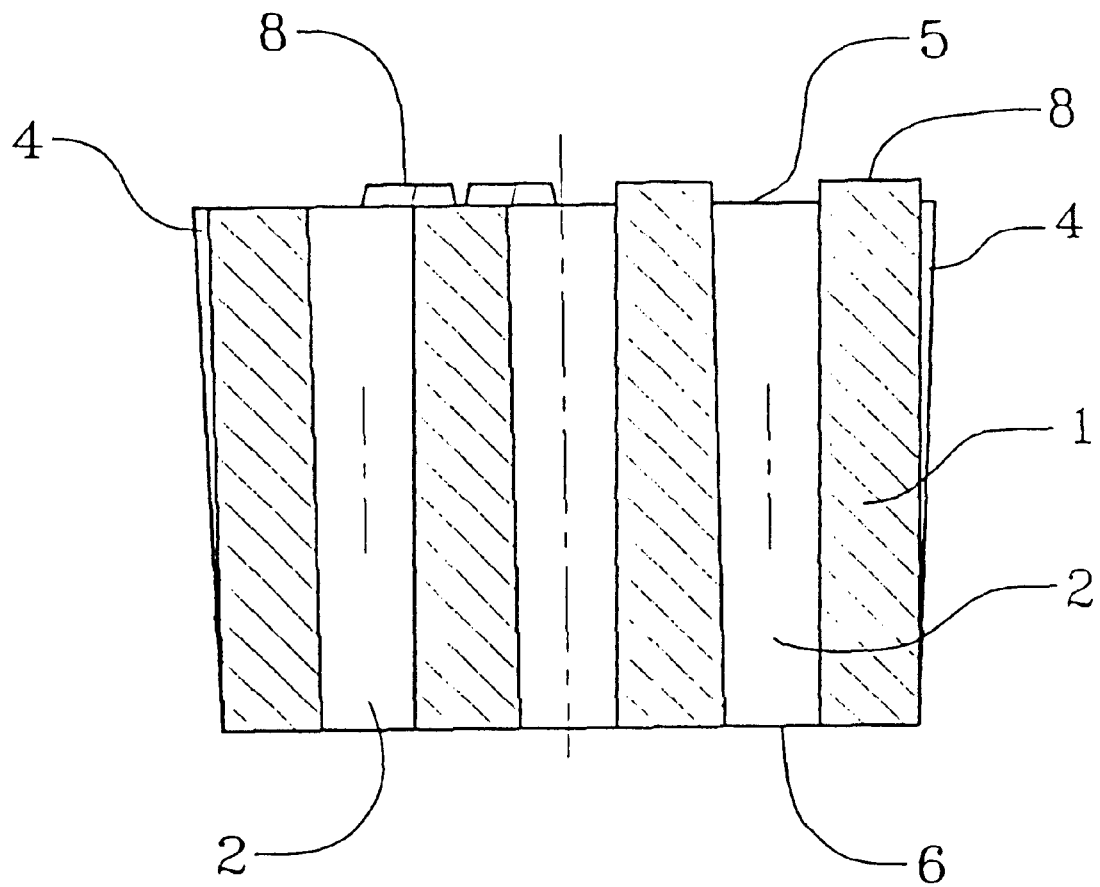
FIG. 2 is a sectional view of the new brick.

FIG. 2 is a center section of the brick showing refractory material 1, internal vertical channels 2, and outside edges 4. Outside edges 4 are tapered inwardly from the top 5 of the brick to the bottom 6. Raised portions 8 are also seen on the top 5.

Figure 3:
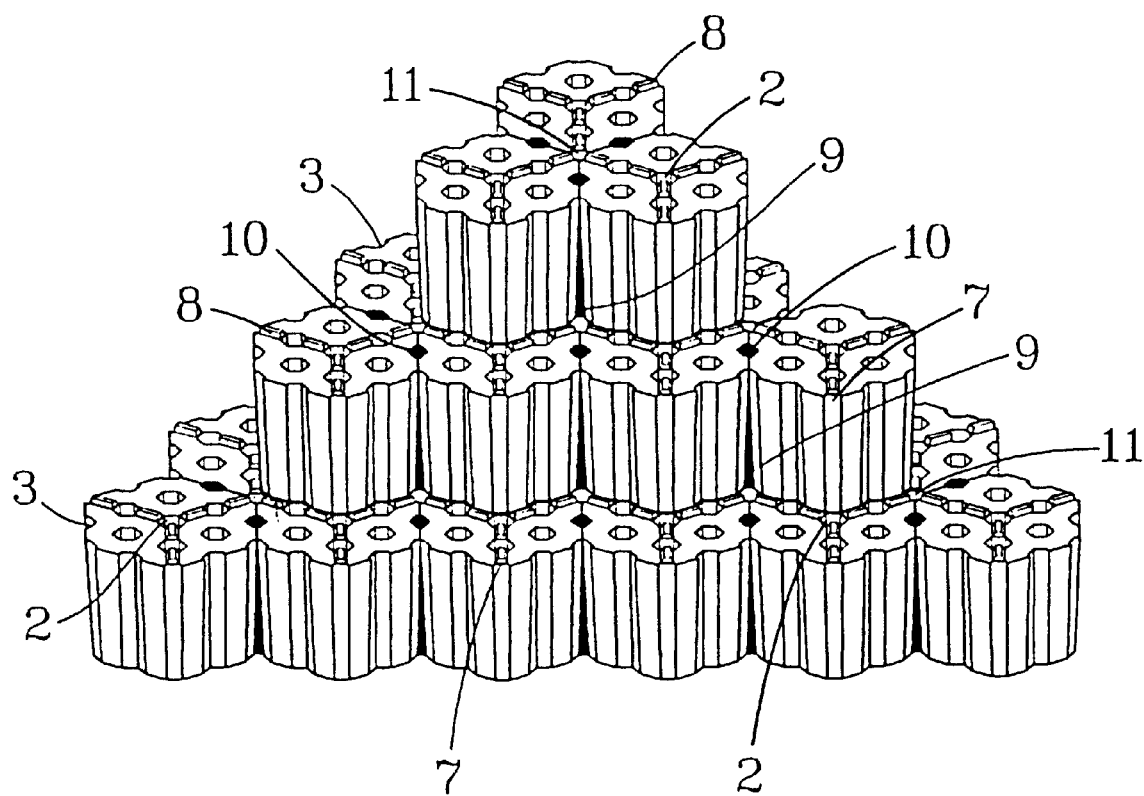
FIG. 3 shows an assemblage of the bricks, demonstrating how the horizontal passages in particular are formed.

FIG. 3 illustrates how the bricks are assembled. It will be seen that the raised portions 8 of any three bricks placed together will form a hexagonal area in which the bottom 6 of a fourth brick fits, forming a triangular space 9 between them which communicates horizontally around the circumference of the brick. Each brick thus can have on it portions of three other bricks and in turn is placed upon portions of three bricks below it. The channel half-openings 3, being centrally located on the hexagonal sides of the brick, come together to form composite vertical channels 10 each of which communicates with other composite vertical channels 10 above and below made from the overlapping bricks. Three of the corner third-openings 7 from three different bricks come together to form a tertiary opening 11 at the juncture of three bricks; these tertiary openings 11 communicate with other tertiary openings 11 above and below and also with the central internal vertical channels 2—that is the vertical channels 2 which are located in the centers of the bricks will communicate with tertiary openings 11 above and below. In all cases, the triangular spaces 9 communicates around the periphery of the brick, permitting flow of gases horizontally as well as vertically to the various openings on the bottom and top surfaces.

The configuration of FIG. 3 may be known as, and will be referred to in the claims, as stacked three-on-one or one-on-three.

The brick claimed by the invention consists of a refractory material 1, inside vertical channels 2, outside sectional vertical channels 3, outside edges 4 which deviate from the vertical and are obtained by connecting the peripheral sides of top face 5 with the reduced peripheral sides of bottom face 6.

Thus it will be seen that the internal vertical channels 2 are desirably evenly spaced, six of them being approximately midway between the center of the brick and the corners, spaced at 60° intervals, and the seventh being centrally located. Likewise the channel half-openings 3 are desirably placed at the center of each side of the hexagonal shape. When placed together as in FIG. 3, with or without cementing, the brick may be used as heat exchangers and as linings for blast furnaces and for other similar refractory uses.

The brick for heat exchangers has the following advantages:

- it provides an increased exchange surface by making the entire lateral surface of the brick come in contact with the gases, which improves the technical performance of the heat exchanger;
- it has the same technical characteristics as the model of the prior art both from the point of view of the weight and the type of refractory material as well as the porosity of the heat exchanger obtained, and it can therefore replace the solution of the prior art without any modification in the size of the operation of the heat exchanger.

I claim:

1. Hexagonal refractory brick having a generally hexagonal top surface, a generally hexagonal bottom surface, said bottom surface having an area smaller than said top surface, and uninterrupted planar side surfaces tapering continuously from said top surface to said bottom surface, said top surface having radial raised members dividing said top surface into areas of one-third of said top surface, said refractory brick further defining a plurality of internal vertical channels and a plurality of external partial vertical channels, said partial vertical channels being positioned to come together to form full vertical channels when said brick is juxtaposed with other bricks.

2. Refractory brick of claim 1 having seven internal vertical channels.

3. Refractory brick of claim 2 wherein six of said internal vertical channels are midway between the center of said brick and each of the corners of said brick, and the seventh internal vertical channel is in the center of said brick.

4. Refractory brick of claim 1 wherein said radial raised members run from the center of said top surface to three of the corners of said hexagonal top surface.

5. Refractory brick of claim 1 wherein said internal vertical channels are positioned to communicate with the internal vertical channels of others of said refractory brick when said bricks are stacked three-on-one or one-on-three.

6. A plurality of refractory bricks of claim 1 stacked three-on-one or one-on-three.

7. A plurality of refractory bricks stacked as in claim 6, whereby lateral channels are formed around said tapering side surfaces near said bottom surfaces of said refractory bricks.

8. Hexagonal refractory brick of claim 1 wherein said bottom surface of said brick fits between said raised members of said top surfaces of three other hexagonal refractory bricks of claim 4 when said three other bricks are juxtaposed with each other.

* * * * *